US010793693B2

(12) United States Patent
Farris et al.

(10) Patent No.: US 10,793,693 B2
(45) Date of Patent: Oct. 6, 2020

(54) METHOD AND FLEXIBLE LATTICE FOAMS

(71) Applicant: NIKE, Inc., Beaverton, OR (US)

(72) Inventors: Bryan N. Farris, North Plains, OR (US); David Turner, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 16/206,184

(22) Filed: Nov. 30, 2018

(65) Prior Publication Data
US 2019/0161591 A1 May 30, 2019

Related U.S. Application Data

(62) Division of application No. 14/926,794, filed on Oct. 29, 2015, now Pat. No. 10,155,855.
(Continued)

(51) Int. Cl.
*C08J 9/12* (2006.01)
*B29C 44/34* (2006.01)
(Continued)

(52) U.S. Cl.
CPC .............. *C08J 9/122* (2013.01); *A43B 13/125* (2013.01); *A43B 13/14* (2013.01); *A43B 13/181* (2013.01);
(Continued)

(58) Field of Classification Search
CPC ..... A43B 13/125; A43B 13/14; A43B 13/181; A43B 13/187; B29C 44/3453;
(Continued)

(56) References Cited

U.S. PATENT DOCUMENTS 6,232,354 B1 * 5/2001 Tan ...................... B29C 44/3446
264/51
6,245,267 B1 * 6/2001 Kreiser .................. B29C 44/26
264/102
(Continued)

FOREIGN PATENT DOCUMENTS

JP 2005271504 A 10/2005
JP 2014005444 A 1/2014
(Continued)

OTHER PUBLICATIONS

Boccaccini et al. "Preparation and characteriscation of poly(lactide-co-glycolide) (PLGA) and PLGA/Bioglass composite tubular foam scaffolds for tissue engineering applications," Materials Science and Engineering C 25 (2005) 23-31. (Year: 2005).*
(Continued)

*Primary Examiner* — Kara B Boyle
(74) *Attorney, Agent, or Firm* — Banner & Witcoff, Ltd.

(57) ABSTRACT

A method of making a foamed article, for example a foamed component for an article or footwear, comprises forming a structure of interconnected, unfoamed, thermoplastic polymeric members spaced to define openings between the thermoplastic polymeric members. The structure may be made by printing a thermoplastic polymeric material with a three-dimensional printer. The thermoplastic polymeric members are heated to a first temperature to soften the thermoplastic polymeric members and the softened thermoplastic polymeric members are infused with at least one inert gas at a first pressure greater than atmospheric pressure. The first pressure is sufficient to cause the at least one inert gas to permeate into the softened thermoplastic polymeric members. After being infused with the inert gas, the pressure is reduced to at least partially foam the thermoplastic polymeric members.

20 Claims, 4 Drawing Sheets

Related U.S. Application Data

(60) Provisional application No. 62/075,535, filed on Nov. 5, 2014.

(51) Int. Cl.
*A43B 13/04* (2006.01)
*A43B 13/14* (2006.01)
*A43B 13/12* (2006.01)
*A43B 13/18* (2006.01)
B29D 35/00 (2010.01)
*B29L 31/50* (2006.01)
*B29K 75/00* (2006.01)
*B29K 101/12* (2006.01)
*B29C 44/08* (2006.01)

(52) U.S. Cl.
CPC ........ *A43B 13/187* (2013.01); B29C 44/3453 (2013.01); B29D 35/00 (2013.01); *A43D 2200/60* (2013.01); *B29C 44/08* (2013.01); *B29K 2075/00* (2013.01); *B29K 2101/12* (2013.01); *B29L 2031/50* (2013.01); *C08J 2300/22* (2013.01)

(58) Field of Classification Search
CPC .... B29C 44/08; B29D 35/00; A43D 2200/60; B29K 2075/00; B29L 2031/50
See application file for complete search history.

(56) References Cited

U.S. PATENT DOCUMENTS

| | | |
|---|---|---|
| 7,994,231 B2 | 8/2011 | Jacobs et al. |
| 8,808,489 B2 | 8/2014 | Taylor |
| 2002/0045040 A1* | 4/2002 | Kanada ............... B29C 44/3453 428/305.5 |
| 2008/0207782 A1 | 8/2008 | Jacobs et al. |
| 2010/0291369 A1 | 11/2010 | McEvoy et al. |
| 2012/0241993 A1 | 9/2012 | Lipton et al. |
| 2014/0275306 A1 | 9/2014 | Watkins et al. |

FOREIGN PATENT DOCUMENTS

| | | |
|---|---|---|
| KR | 850001545 | 10/1985 |
| TW | 201229106 A | 7/2012 |
| WO | 2005105907 A1 | 11/2005 |
| WO | 2014015037 A2 | 1/2014 |
| WO | 2014100462 A1 | 6/2014 |
| WO | 2015177571 A1 | 11/2015 |

OTHER PUBLICATIONS

Feb. 4, 2016—(WO) ISR & WO—App. No. PCT/US15/055632.
Jul. 10, 2020—(EP) Extended European Search Report—App. No. 201639656.4.

\* cited by examiner

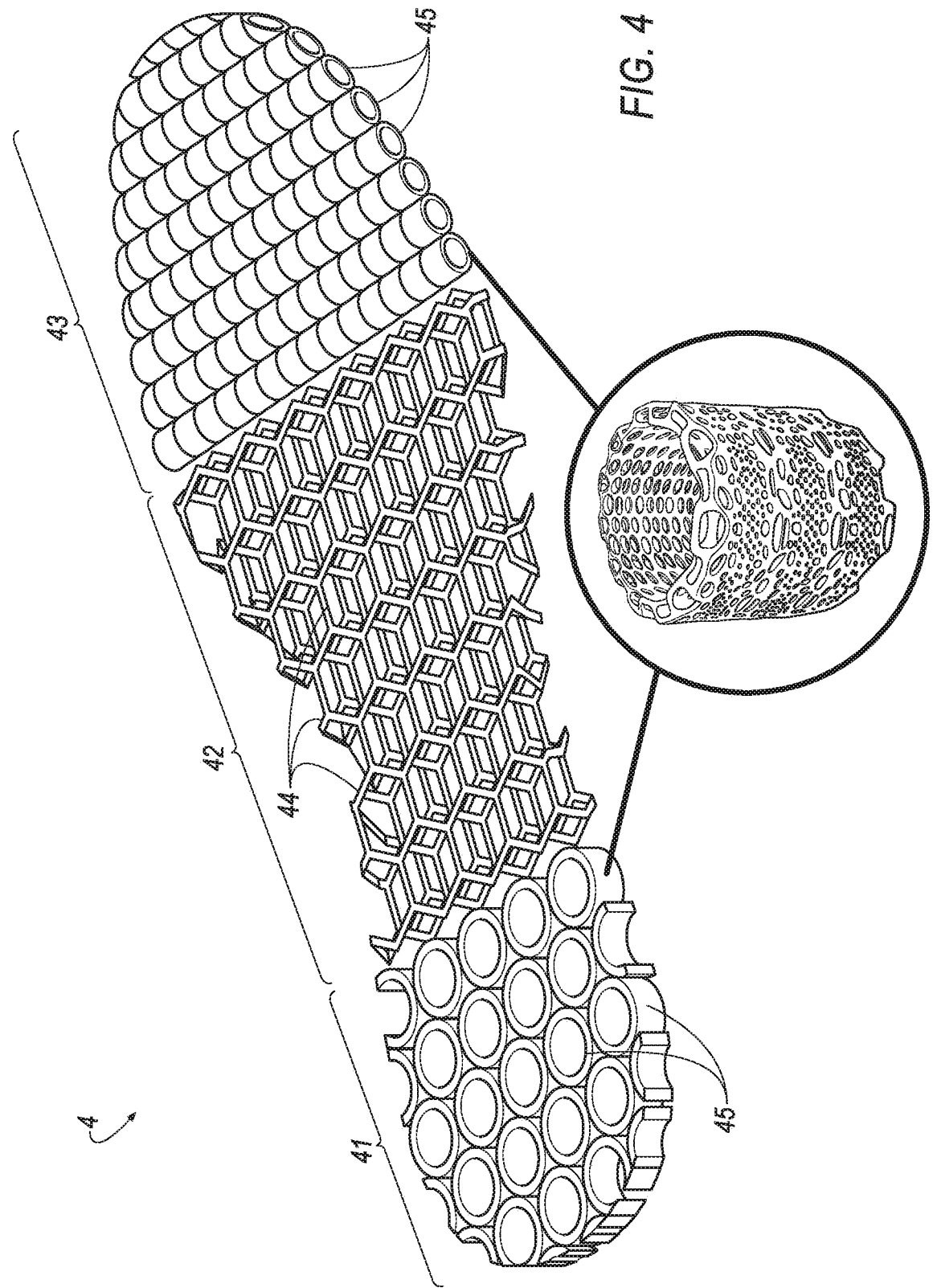

METHOD AND FLEXIBLE LATTICE FOAMS

This application is a divisional of U.S. patent application Ser. No. 14/926,794, filed Oct. 29, 2015, which claims priority to U.S. Provisional Patent Application No. 62/075,535, filed Nov. 5, 2014, which applications are incorporated herein in their entirety by reference.

FIELD

The present disclosure relates to methods for forming flexible foams and articles made by the methods.

INTRODUCTION

This section provides background information related to the present disclosure which is not necessarily prior art.

Flexible foams are used for cushioning, support, and to absorb impacts, for example in seats and furniture, footwear, packaging, straps, protective gear, and so on. In general, foam materials are made in sheets or blocks and cut to a desired pre-form shape, then finished to a final shape.

Foamed midsoles for athletic footwear may be made from crosslinked poly(ethylene co-vinyl acetate) (EVA), for example, which may be cut from a block or sheet of foam. Injection molding may typically not be used because foam materials made by this method must have higher specific gravities to foam uniformly.

DRAWINGS

The drawings described herein are for illustrative purposes only of selected embodiments and not all possible implementations, and are not intended to limit the scope of the present disclosure.

FIG. 4 is a perspective view of an alternative embodiment of a flexible foamed lattice midsole for an article of footwear

DESCRIPTION

Figure 1B:
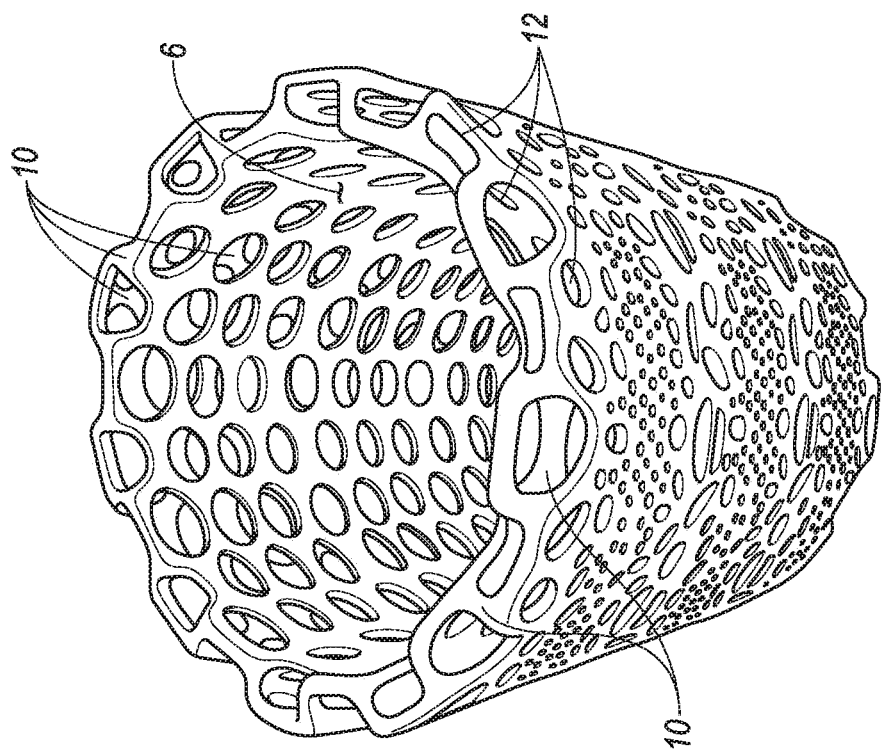
FIG. 1A and FIG. 1B are respectively side and top perspective views of an example flexible foamed lattice.

A method of making a foamable article, for example a foamable component for an article of footwear, comprises forming a structure of interconnected thermoplastic polymeric members spaced to define openings between the thermoplastic polymeric members. Each opening may have at least one dimension that is greater than at least one dimension of at least one adjacent unfoamed thermoplastic polymeric member. All or some of the openings may be interconnected. All or some of the openings may be enclosed by thermoplastic members. At least a portion of the interconnected thermoplastic polymeric members may be arranged in a repeating pattern, for example a pattern that repeats in two perpendicular directions, for example a regular three-dimensional lattice pattern with uniform repeating units. The structure may be made by printing a thermoplastic polymeric material with a three-dimensional printer in a unitary article of the interconnected thermoplastic polymeric members. The thermoplastic polymeric material may be a thermoplastic elastomer composition. The thermoplastic polymeric members may have a cross-sectional shape that is generally circular, oval, square, rectangular, or other polygonal shape, or that is irregularly shaped. "Generally" is used here to indicate an overall shape that may have imperfections and irregularities, such as bumps, dents, and so on. The thermoplastic polymeric members are heated to a first temperature that is below a temperature at which the structure would collapse to soften the thermoplastic polymeric members and then the softened thermoplastic polymeric members are infused with at least one inert gas at a first pressure. The first pressure may be greater than atmospheric pressure. The temperature to which the thermoplastic polymeric members are heated is sufficient to soften the thermoplastic polymeric members, but does not cause collapse of the structure of interconnected thermoplastic polymeric members spaced to define openings between the thermoplastic polymeric members. The inert gas may be a noble gas, nitrogen, carbon dioxide, or any combination thereof. The first pressure is sufficient to cause the at least one inert gas to permeate into the softened thermoplastic polymeric members, forming infused softened thermoplastic polymeric members. The amount of the at least one inert gas infused into the softened thermoplastic polymer members is sufficient to produce at least partial foaming of the softened thermoplastic polymer in a subsequent step where the infused softened thermoplastic polymer is exposed to an atmosphere at a lower pressure. After being infused with the inert gas, the thermoplastic polymeric members can optionally be cooled to a second temperature, and the pressure reduced to atmospheric pressure (i.e., without foaming the thermoplastic polymeric members). The foamable article may include portions other than the thermoplastic polymeric members, which portions may be interior or exterior portions. An interior portion may be, for example, an interior solid portion of regular geometric shape or of irregular shape. An exterior portion may form at least a portion of a side or perimeter of the foamable article, which may be of uniform or non-uniform thickness, and which may include extensions into the article. The portions other than the thermoplastic polymeric members can be formed from a second thermoplastic material. The second thermoplastic material can have a Vicat softening temperature above the Vicat softening temperature of the thermoplastic polymeric members. The portions other than the thermoplastic polymeric members can be formed by injection molding. Alternatively, the portions other than the thermoplastic polymeric members can be formed using vacuum and/or thermoforming techniques. The article may include a first kind of interconnected thermoplastic polymeric members that are softened and infused with the at least one inert gas and a second kind of interconnected thermoplastic polymeric members that are not softened and/or are not infused during the step of heating and infusing of the first kind of interconnected thermoplastic polymeric members.

The foamable article, for example a foamable component for an article or footwear, can be again heated to a temperature at which the thermoplastic polymeric members soften to at least partially foam the thermoplastic polymeric members. The foamable article can be heated to the temperature at which the thermoplastic polymeric members soften under pressure (for example at a pressure greater than atmospheric pressure) and foamed with a reduction of the pressure, for example a reduction to atmospheric pressure.

A method of making a foamed article, for example a foamed component for an article or footwear, comprises heating interconnected, unfoamed, thermoplastic polymeric members of the article that are infused with at least one inert gas to soften the thermoplastic polymeric members. The thermoplastic polymeric material may be a thermoplastic elastomer composition. The thermoplastic polymeric members may be infused with inert gas below or up to a saturation point. In other words, the thermoplastic polymeric members may be infused with the inert gas at a concentration below the saturation point, or at the saturation point. The interconnected, unfoamed, thermoplastic polymeric members are heated to a first temperature that is below a temperature at which the structure would collapse to soften the thermoplastic polymeric members and allow the thermoplastic polymeric members to at least partially foam. The unfoamed, thermoplastic polymeric members are spaced to define openings between the unfoamed, thermoplastic polymeric members. Each opening may have at least one dimension that is greater than at least one dimension of at least one adjacent unfoamed thermoplastic polymeric member. All or some of the openings may be interconnected. All or some of the openings may be enclosed by thermoplastic members. After the thermoplastic polymeric members at least partially foam, openings may remain between a portion of, or all of, the thermoplastic polymeric members. At least a portion of the interconnected thermoplastic polymeric members may be arranged in a repeating pattern, for example a pattern that repeats in two perpendicular directions, for example a regular three-dimensional lattice pattern with uniform repeating units. The thermoplastic polymeric members may have a cross-sectional shape that is circular, oval, square, rectangular, or other polygonal shape, or that is irregularly shaped. The inert gas may be a noble gas, nitrogen, carbon dioxide, or any combination thereof. The thermoplastic polymeric members may be heated to the first temperature at a first pressure, then the pressure may be reduced to a second pressure less than the first pressure to allow the thermoplastic polymeric members to at least partially foam. The first pressure may be greater than atmospheric pressure.

A method of making a closed-cell foamed article, for example a foamed component for an article or footwear, comprises forming a structure of interconnected, unfoamed, thermoplastic polymeric members spaced to define openings between the thermoplastic polymeric members. Each opening may have at least one dimension that is greater than at least one dimension of at least one adjacent unfoamed thermoplastic polymeric member. All or some of the openings may be interconnected. All or some of the openings may be enclosed by thermoplastic members. At least a portion of the interconnected thermoplastic polymeric members may be arranged in a repeating pattern, for example a pattern that repeats in two perpendicular directions, for example a regular three-dimensional lattice pattern with uniform repeating units. The structure may be made by printing a thermoplastic polymeric material with a three-dimensional printer in a unitary article of the interconnected thermoplastic polymeric members. The thermoplastic polymeric material may be a thermoplastic elastomer composition. The thermoplastic polymeric members may have a cross-sectional shape that is circular, oval, square, rectangular, or other polygonal shape, or that is irregularly shaped. In a first location, the thermoplastic polymeric members are heated to a first temperature below a temperature at which the structure collapses to soften the thermoplastic polymeric members and the softened thermoplastic polymeric members are infused with at least one inert gas at a first pressure. The inert gas may be a noble gas, nitrogen, carbon dioxide, or any combination thereof. The amount of inert gas infused into the thermoplastic polymeric members may be below or up to a saturation point. The first pressure is sufficient to cause the at least one inert gas to permeate into the softened thermoplastic polymeric members. The first pressure can be greater than atmospheric pressure. After being infused with the inert gas, the thermoplastic polymeric members are cooled to a second temperature, and the pressure is reduced, for example, to atmospheric pressure. The cooled structure is transferred to a second location; and the thermoplastic polymeric members are heated to a third temperature below a temperature at which the structure collapses to soften the thermoplastic polymeric members and at least partially foam the thermoplastic polymeric members. During this step, the pressure is a pressure at which the infused inert gas will partition out of the softened thermoplastic members, causing the softened thermoplastic to foam. The second location may be a mold. The second location may be remote, such as a location in a different building from a building in which the article is infused with the at least one inert gas. The third temperature may be the same as or different from the first temperature. The thermoplastic polymeric members may be heated to the third temperature at a second pressure greater than atmospheric pressure, then the pressure may be reduced to a third pressure less than the second pressure to allow the thermoplastic polymeric members to at least partially foam.

A method of making a closed-cell foamed article, for example a foamed component for an article or footwear, comprises forming a structure comprising interconnected, unfoamed, thermoplastic polymeric members spaced to define openings between the thermoplastic polymeric members. Each opening may have at least one dimension that is greater than at least one dimension of at least one adjacent unfoamed thermoplastic polymeric member. All or some of the openings may be interconnected. All or some of the openings may be enclosed by thermoplastic members. At least a portion of the interconnected thermoplastic polymeric members may be arranged in a repeating pattern, for example a pattern that repeats in two perpendicular directions, for example a regular three-dimensional lattice pattern with uniform repeating units. The structure may be made by printing a thermoplastic polymeric material with a three-dimensional printer as an article of the interconnected thermoplastic polymeric members. The thermoplastic polymeric material may be a thermoplastic elastomer composition. The thermoplastic polymeric members may have a cross-sectional shape that is circular, oval, square, rectangular, or other polygonal shape, or that is irregularly shaped. The foamable article may include portions other than the thermoplastic polymeric members, which portions may be interior or exterior portions. An interior portion may be, for example, an interior solid portion of regular geometric shape or of irregular shape. An exterior portion may form at least a portion of a side or perimeter of the article, which may be of uniform or non-uniform thickness, and which may include extensions into the article. The article may include a first kind of interconnected thermoplastic polymeric members that are softened and infused with the at least one inert gas and a second kind of interconnected thermoplastic polymeric members that are not softened and/or infused with the at least one inert gas under the conditions at which the first kind of interconnected thermoplastic polymeric members are softened and infused. These features may be included in the article by using more than one material in printing the article by three-dimensional printing. The thermoplastic polymeric members are heated to a first temperature below a temperature at which the structure collapses to soften the thermoplastic polymeric members and the softened thermoplastic polymeric members are infused with at least one inert gas at a first pressure greater than atmospheric pressure. The inert gas may be a noble gas, nitrogen, carbon dioxide, or any combination thereof. The amount of inert gas infused into the thermoplastic polymeric members may be below or up to a saturation point. The first pressure is sufficient to cause the at least one inert gas to permeate into the softened thermoplastic polymeric members. The pressure is reduced to second pressure below the first pressure while the first polymeric resin is or remains at or below a temperature at which the structure collapses and at which the thermoplastic polymeric members are softened to at least partially foam the thermoplastic polymeric members.

The article with the at least partially foamed, thermoplastic polymeric members may be subjected to a second foaming step by heating the at least partially foamed, thermoplastic polymeric members to a second temperature at or below a temperature at which the structure collapses to soften the thermoplastic polymeric members and infusing the softened thermoplastic polymeric members with at least one inert gas at a third pressure that is sufficient to cause the at least one inert gas to permeate into the softened thermoplastic polymeric members, and then reducing the pressure to fourth pressure below the second pressure while the first polymeric resin is or remains at or below a temperature at which the structure collapses to further foam the thermoplastic polymeric members. The third pressure may be greater than atmospheric pressure. The second temperature may be the same as or different from the first temperature. The at least one inert gas used in the second foaming step may be the same as or different from the inert gas used in the original foaming step. Suitable examples of the inert gas are again noble gasses, nitrogen, carbon dioxide, or any combination of these. The amount of inert gas infused into the thermoplastic polymeric members may be below or up to a saturation point. The third pressure is sufficient to cause the at least one inert gas to permeate into the softened thermoplastic polymeric members and can be the same as or different from the first pressure. The pressure is reduced to fourth pressure below the first pressure while the first polymeric resin is or remains at or below a temperature at which the structure collapses to further foam the thermoplastic polymeric members. The fourth pressure can be the same as or different from the second pressure. The second foaming step can produce a foamed article of a lower density. The second foaming step may also be used for further shaping the foamed article, for example when the second foaming step is carried out in a mold or with a partial mold.

The disclosed methods allow a foamed article of a desired shape to be made without cutting the shape from a block or tooling for injection molding a shaped foam. The disclosed methods also allow a foamed article of a desired shape to be made without using a process which requires removing material, either in foamed or pre-foamed form, in order to create a structure of interconnected foamed members spaced to define openings therebetween. Three-dimensional printing of the thermoplastic polymeric members in their desired configuration eliminates the need to create tooling and avoids waste generated by cutting and trimming foam sheets or blocks into a desired shape. Three-dimensional printing of the thermoplastic polymeric members permits shapes with thermoplastic polymeric members spaced in three-dimensions that could not be injection molded or easily cut from a block of foam. The thermoplastic polymeric members of the disclosed methods can be selected to have dimensions that facilitate adsorption of the inert gas and provide desired cushioning, support, and impact resistance. Further shaping of the foamed article can be carried out with relatively simple molds or partial molds.

When the structure is heated the temperatures to soften the thermoplastic polymeric members to infuse them with the at least one inert gas or to cause the infused polymeric members to foam, the structure should not collapse. The structure is considered to have collapsed if the total combined volume of its openings decreases more than 50% as a result of deformation of its polymeric members from the heat. It is desirable for the total combined volume of openings of the structure to decrease by not more than 20% or by not more than 10% or by not more than 5% or by not more than 1% or not to decrease by any noticeable amount (substantially 0%).

In any of these methods, after the thermoplastic polymeric members at least partially foam, openings may remain between a portion or all of the thermoplastic polymeric members. The foamed article may include portions other than the thermoplastic polymeric members, which portions may be interior or exterior portions. An interior portion may be, for example, an interior solid portion of regular geometric shape or of irregular shape. An exterior portion may form at least a portion of a side or perimeter of the foamable article, which may be of uniform or non-uniform thickness, and which may include extensions into the article. The article may include a first kind of interconnected thermoplastic polymeric members that are softened and infused with the at least one inert gas and a second kind of interconnected thermoplastic polymeric members that are not infused with the at least one inert gas. The foamed article may be a midsole or midsole pre-form for an article of footwear. The foamed article may be incorporated as cushioning into other articles. As nonlimiting examples, the foamed article may be a foamed element in footwear, such as a part of a footwear upper, such as a foamed element in a collar, a midsole or a part of a midsole, or an outsole or a part of an outsole; foam padding in shinguards, shoulder pads, chest protectors, masks, helmets or other headgear, knee protectors, and other protective equipment; an element placed in an article of clothing between textile layers; or may be used for other known padding applications for protection or comfort, such as for a pillow, cushion, or in an article of furniture. In various embodiments, the molded article is a midsole for an article of footwear. A midsole provides cushioning in the footwear. A midsole should be durable but also preferably adds as little weight as possible to the footwear while still cushioning to the desired degree. A midsole also should be able to be bonded to an outsole, an upper, or any other components (e.g., a shank, an airbag, or decorative components) in making an article of footwear.

As used in this description, "a," "an," "the," "at least one," and "one or more" indicate interchangeably that at least one of the item is present; a plurality of such items may be present unless the context unequivocally indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the technological field with this ordinary meaning, then "about" as used herein indicates at least variations that may arise from ordinary methods of measuring and using such parameters. In addition, disclosure of ranges are to be understood as specifically disclosing all values and further divided ranges within the range. The terms "comprising,"

"including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items.

Figure 1A:
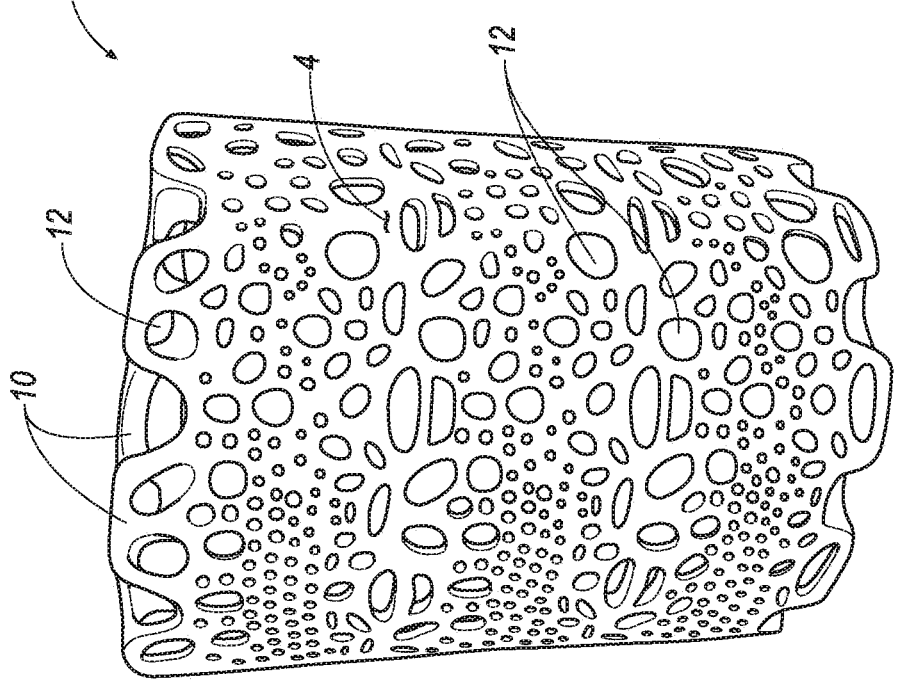

FIGS. 1A and 1B illustrate a first example of a foamed article 1 made by the disclosed methods. Foamed article has a generally cylindrical shape with an outer surface 4 and inner surface 6. The foamed article 1 is formed of interconnected thermoplastic polymeric members 10 of varying sizes that define a plurality of openings 12 therebetween. Top perspective view 1B shows that some openings 12 may extend directly from outer surface 4 to inner surface 6 while interconnected thermoplastic polymeric members 10 within the article pass through or block other openings. In article 1, the shapes and patterns of the interconnected thermoplastic polymeric members 10 are irregular in all three dimensions, although together they form a generally cylindrical article of generally uniform thickness.

Figure 2:
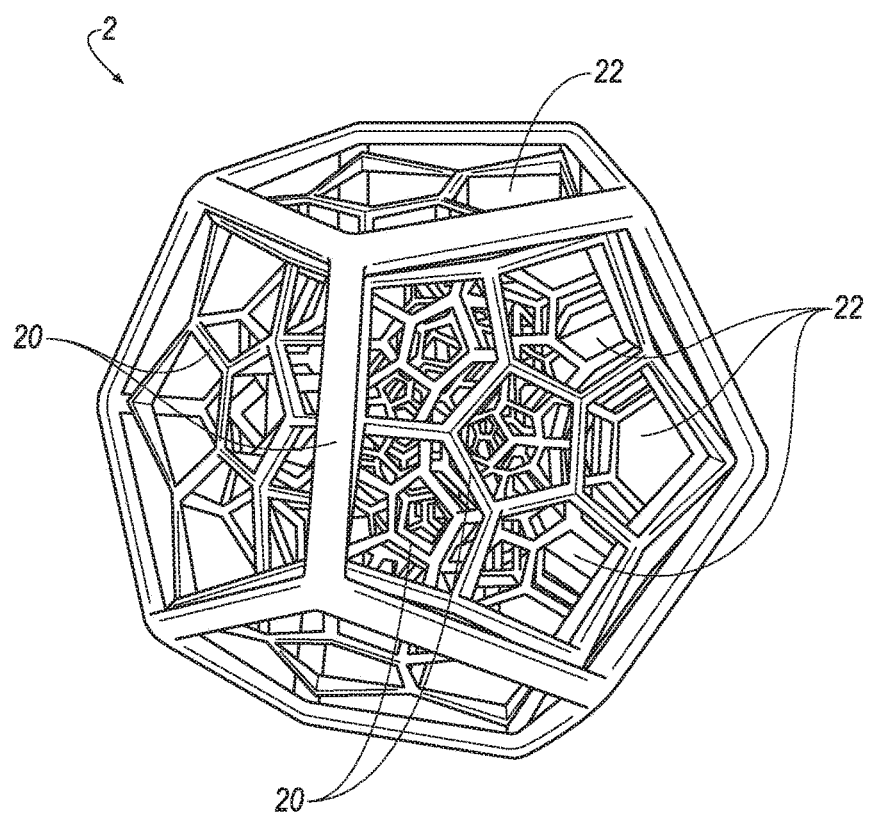
FIG. 2 is a perspective view of an alternative example flexible foamed lattice.

FIG. 2 is an example of another article made of foamed interconnected thermoplastic polymeric members. In article 2, foamed interconnected thermoplastic polymeric members 20 are arranged in pentagonal shapes with pentagonal openings 22. Moving from the outermost pentagons in, the foamed interconnected thermoplastic polymeric members 20 become thinner and shorter to form smaller and smaller pentagons. Openings 22 are not lined up from one side of article 2 to an opposite side, but rather a path through the article 2 is tortuous.

Figure 3:
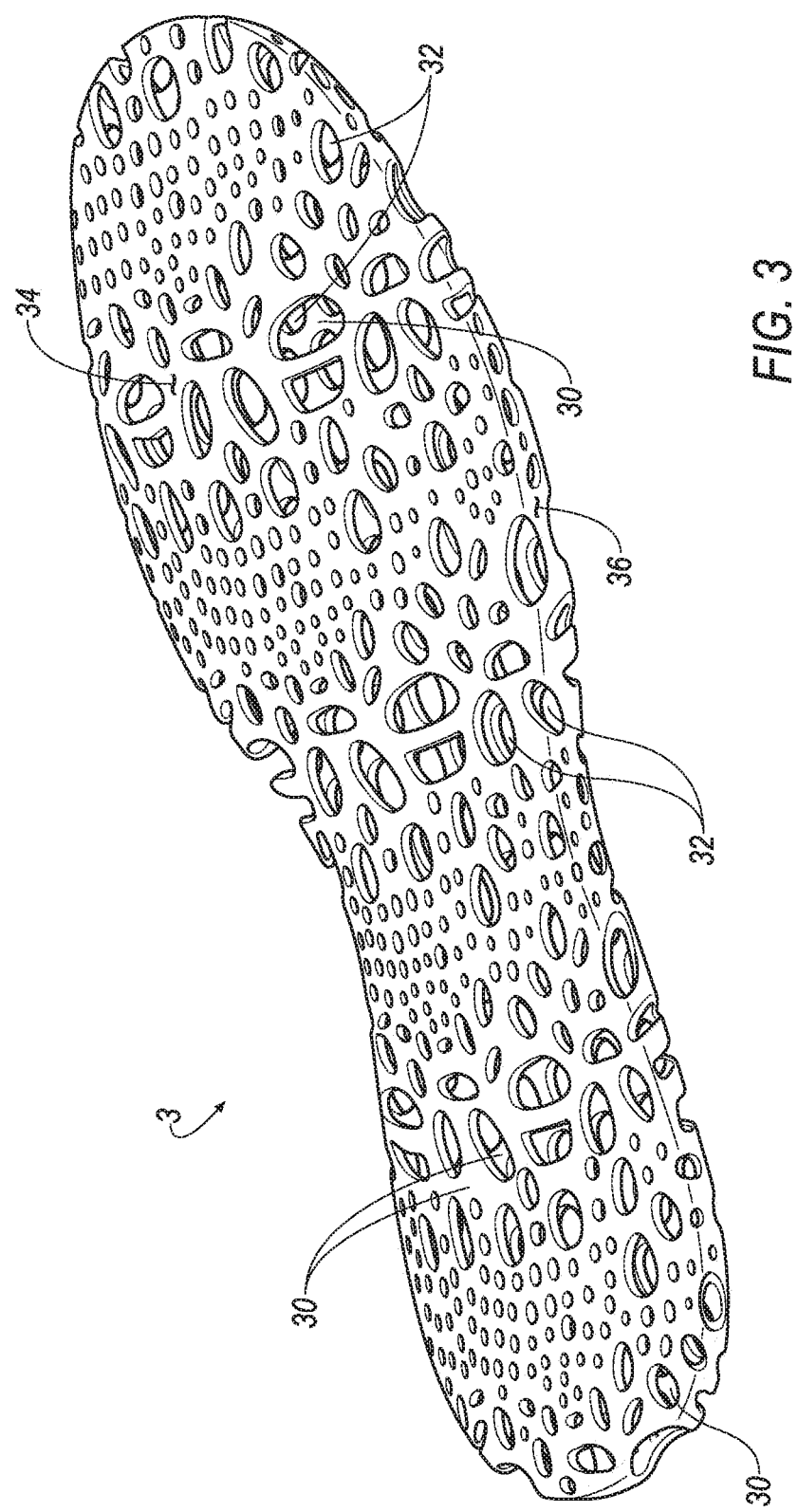
FIG. 3 is a perspective view of an embodiment of a flexible foamed lattice midsole for an article of footwear.

FIG. 3 is an example of a foamed midsole 3 for an article of footwear made of a structure of interconnected thermoplastic polymeric members 30 spaced to define openings 32 between the thermoplastic polymeric members 30. The thermoplastic polymeric members 30 and openings 32 are arranged generally similarly to those in FIGS. 1A and 1B, as could be obtained by three-dimensional printing of the structure of FIGS. 1A and 1B in a flat shape instead of in a cylindrical shape. In the foamed midsole 3, there are openings 32 in side surface 36 as well as in top surface 34. Openings 32 may be generally perpendicular, generally parallel, or in another, random direction relative to top surface 34. As shown, openings 32 may be randomly interrupted by thermoplastic polymeric members 30 underlying the top layer of thermoplastic polymeric members 30 forming top surface 34.

FIG. 4 is a second example of a foamed midsole 4 for an article of footwear made of a structure of interconnected thermoplastic polymeric members spaced to define openings between the thermoplastic polymeric members. Foamed midsole 4 is formed of a heel section 41, midfoot section 42, and forefoot section 43. Heel section 41 and forefoot section 43 are formed of articles 1 as shown in FIGS. 1A, 1B. In heel section 4, articles 1 are arranged in a single, side-by-side layer, while in forefoot section 43 articles 1 are arranged end-to-end in side-by-side rows 45. Although shown as a combination of articles 1, heel section 41 and forefoot section 43 can be formed as an integral structure by three-dimensional printing. Similarly, three-dimensional printing of a structure of interconnected thermoplastic polymeric members can be used to form one or more portions of a midsole structure, such as, for example, heel sections, forefoot sections, midfoot sections, etc. Midfoot section 42 comprises foamed interconnected thermoplastic polymeric members 44 spaced to define hexagonal openings. Interconnected thermoplastic polymeric members 44 are printed in offset layers parallel to a major face of midsole 4 with connecting thermoplastic polymeric members 44 between the layers. Heel section 41, midfoot section 42, and forefoot section 43 can be made by three-dimensional printing as an integral article of the three structures of sections 41, 42, and 43.

A structure of interconnected thermoplastic polymeric members spaced to define openings between the thermoplastic polymeric members can be formed by three-dimensional printing a thermoplastic polymeric composition. A thermoplastic polymeric composition, which may include a thermoplastic elastomer, and which is suitable for foaming with at least one inert gas, can be extruded into a length (a "filament") having an appropriate cross-section for processing through a three-dimensional fabricator. The three-dimensional fabricator deposits a melt of the thermoplastic polymeric composition in a pre-determined pattern onto a surface in a process that is also known as three-dimensional printing. The process is described in detail in a number of publications, for example in US Patent Application Publication No. 2012/0241993, which is incorporated herein by reference. Three-dimensional fabrication or printing equipment is available commercially, for example from MakerBot under the tradename REPLICATOR.

The thermoplastic polymeric composition can include any thermoplastic polymer, including thermoplastic elastomers that are suitable for the intended use of the foamed article to be made. Nonlimiting examples of suitable thermoplastic polymers and elastomers include thermoplastic polyurethane elastomers, thermoplastic polyurea elastomers, thermoplastic polyamide elastomers (PEBA or polyether block polyamides), thermoplastic polyester elastomers, metallocene-catalyzed block copolymers of ethylene and α-olefins having 4 to about 8 carbon atoms, and styrene block copolymer elastomers such as poly(styrene-butadiene-styrene), poly(styrene-ethylene-co-butylene-styrene), and poly(styrene-isoprene-styrene).

Thermoplastic polyurethane elastomers may be selected from thermoplastic polyester-polyurethanes, polyether-polyurethanes, and polycarbonate-polyurethanes, including, without limitation, polyurethanes polymerized using as polymeric diol reactants polyethers and polyesters including polycaprolactone polyesters. These polymeric diol-based polyurethanes are prepared by reaction of a polymeric diol (polyester diol, polyether diol, polycaprolactone diol, polytetrahydrofuran diol, or polycarbonate diol), one or more polyisocyanates, and, optionally, one or more chain extension compounds. Preferably the polymeric diol-based polyurethane is substantially linear (i.e., substantially all of the reactants are difunctional). Diisocyanates used in making the polyurethane elastomers may be aromatic or aliphatic, and examples include, without limitation, isophorone diisocyanate (IPDI), methylene bis-4-cyclohexyl isocyanate ($H_{12}$MDI), cyclohexyl diisocyanate (CHDI), m-tetramethyl xylene diisocyanate (m-TMXDI), p-tetramethyl xylene diisocyanate (p-TMXDI), 4,4'-methylene diphenyl diisocyanate (MDI, also known as 4,4'-diphenylmethane diisocyanate), 2,4- or 2,6-toluene diisocyanate (TDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, and the like, which may be used in combinations. Chain extension compounds, or extenders, have two functional groups reactive with isocyanate groups, for example, diols, dithiols, diamines, or compounds having a mixture of hydroxyl, thiol, and amine groups, such as alkanolamines, aminoalkyl mercaptans, and hydroxyalkyl mercaptans, among others. The molecular weight of the chain extenders may range from about 60 to about 400. Alcohols and amines are typically used. Examples of useful diols include ethylene glycol and lower oligomers of ethylene glycol including diethylene glycol, triethylene glycol and tetraethylene glycol; propylene glycol and lower oligomers of propylene glycol including dipropylene glycol, tripropylene glycol and tetrapropylene glycol; cyclohexanedimethanol, 1,6-hexanediol, 2-ethyl-1,6-hexanediol, 1,4-butanediol, 2,3-butanediol, 1,5-pentanediol, 1,3-propanediol, butylene glycol, neopentyl glycol, and combinations of these. Suitable diamine extenders include, without limitation, ethylene diamine, diethylene triamine, triethylene tetraamine, and combinations of these. Other typical chain extenders are amino alcohols such as ethanolamine, propanolamine, butanolamine, and combinations of these.

The polyester diols used in forming a thermoplastic polyurethane elastomer are in general prepared by the condensation polymerization of one or more polyacid compounds and one or more polyol compounds. Preferably, the polyacid compounds and polyol compounds are di-functional, i.e., diacid compounds and diols are used to prepare substantially linear polyester diols, although minor amounts of mono-functional, tri-functional, and higher functionality materials (perhaps up to 5 mole percent) can be included to provide a slightly branched, but uncrosslinked polyester polyol component. Suitable dicarboxylic acids include, without limitation, glutaric acid, succinic acid, malonic acid, oxalic acid, phthalic acid, hexahydrophthalic acid, adipic acid, maleic acid, suberic acid, azelaic acid, dodecanedioic acid, their anhydrides and polymerizable esters (e.g., methyl esters) and acid halides (e.g., acid chlorides), and mixtures of these. Suitable polyols include those already mentioned, especially the diols. In preferred embodiments, the carboxylic acid component includes one or more of adipic acid, suberic acid, azelaic acid, phthalic acid, dodecanedioic acid, or maleic acid (or the anhydrides or polymerizable esters of these) and the diol component includes one or more of 1,4-butanediol, 1,6-hexanediol, 2,3-butanediol, or diethylene glycol. Typical catalysts for the esterification polymerization are protonic acids, Lewis acids, titanium alkoxides, and dialkyltin oxides. Polylactones, such as polycaprolactone diol, may also be used.

A polymeric polyether may be obtained by reacting a diol initiator, e.g., 1,3-propanediol or ethylene or propylene glycol, with alkylene oxide chain-extension reagent. Polyethylene oxide (also called polyethylene glycol), polypropylene oxide (also called polypropylene glycol), and block polyethylene oxide-polypropylene oxide copolymers may be used. Two or more different alkylene oxide monomers may be randomly copolymerized by coincidental addition or polymerized in blocks by sequential addition. Tetrahydrofuran may be polymerized by a cationic ring-opening reaction initiated by formation of a tertiary oxonium ion. Polytetrahydrofuran is also known as polytetramethylene ether glycol (PTMEG).

Aliphatic polycarbonate diols that may be used in making a thermoplastic polyurethane elastomer are prepared by the reaction of diols with dialkyl carbonates (such as diethyl carbonate), diphenyl carbonate, or dioxolanones (such as cyclic carbonates having five- and six-member rings) in the presence of catalysts like alkali metal, tin catalysts, or titanium compounds. Useful diols include, without limitation, any of those already mentioned. Aromatic polycarbonates are usually prepared from reaction of bisphenols, e.g., bisphenol A, with phosgene or diphenyl carbonate.

The polymeric diol preferably has a weight average molecular weight of at least about 500, more preferably at least about 1000, and even more preferably at least about 1800 and a weight average molecular weight of up to about 10,000, but polymeric diols having weight average molecular weights of up to about 5000, especially up to about 4000, may also be preferred. The polymeric diol advantageously has a weight average molecular weight in the range from about 500 to about 10,000, preferably from about 1000 to about 5000, and more preferably from about 1500 to about 4000. The weight average molecular weights may be determined by ASTM D-4274. The polymeric diol segments typically are from about 35% to about 65% by weight of the polyurethane polymer, and preferably from about 35% to about 50% by weight of the polyurethane polymer.

Suitable thermoplastic polyurea elastomers may be prepared by reaction of one or more polymeric diamines with one or more of the polyisocyanates already mentioned and one or more of the diamine extenders already mentioned. Polymeric diamines include polyoxyethylene diamines, polyoxypropylene diamines, poly(oxyethylene-oxypropylene) diamines, and poly(tetramethylene ether) diamines.

Suitable thermoplastic polyamide elastomers may be obtained by: (1) polycondensation of (a) a dicarboxylic acid, such as oxalic acid, adipic acid, sebacic acid, terephthalic acid, isophthalic acid, 1,4-cyclohexanedicarboxylic acid, or any of the other dicarboxylic acids already mentioned with (b) a diamine, such as ethylenediamine, tetramethylenediamine, pentamethylenediamine, hexamethylenediamine, or decamethylenediamine, 1,4-cyclohexanediamine, m-xylylenediamine, or any of the other diamines already mentioned; (2) a ring-opening polymerization of a cyclic lactam, such as ε-caprolactam or ω-laurolactam; (3) polycondensation of an aminocarboxylic acid, such as 6-aminocaproic acid, 9-aminononanoic acid, 11-aminoundecanoic acid, or 12-aminododecanoic acid; or (4) copolymerization of a cyclic lactam with a dicarboxylic acid and a diamine to prepare a carboxylic acid-functional polyamide block, followed by reaction with a polymeric ether diol (polyoxyalkylene glycol) such as any of those already mentioned. Polymerization may be carried out, for example, at temperatures of from about 180° C. to about 300° C. Specific examples of suitable polyamide blocks include NYLON 6, NYLON 66, NYLON 610, NYLON 11, NYLON 12, copolymerized NYLON, NYLON MXD6, and NYLON 46.

Thermoplastic polyester elastomers have blocks of monomer units with low chain length that form the crystalline regions and blocks of softening segments with monomer units having relatively higher chain lengths. Thermoplastic polyester elastomers are commercially available under the tradename HYTREL from DuPont.

Metallocene-catalyzed block copolymers of ethylene and α-olefins having 4 to about 8 carbon atoms are prepared by single-site metallocene catalysis of ethylene with a softening comonomer such as hexane-1 or octene-1, for example in a high pressure process in the presence of a catalyst system comprising a cyclopentadienyl-transition metal compound and an alumoxane. Octene-1 is a preferred comonomer to use. These materials are commercially available from ExxonMobil under the tradename Exact™ and from the Dow Chemical Company under the tradename Engage™.

Styrene block copolymer elastomers such as poly(styrene-butadiene-styrene), poly(styrene-ethylene-co-butylene-styrene), and poly(styrene-isoprene-styrene) may be prepared by anionic polymerization in which the polymer segments are produced sequentially, first by reaction of an alkyl-lithium initiator with styrene, then continuing polymerization by adding the alkene monomer, then completing polymerization by again adding styrene. S-EB-S and S-EP-S block copolymers are produced by hydrogenation of S-B-S and S-I-S block copolymers, respectively.

The thermoplastic polymeric composition may be formed by three-dimensional printing into an article including a structure of interconnected thermoplastic polymeric members spaced to define openings between them. Each opening may be from about 0.5 mm or from about 1 mm or from about 2 mm to about 5 mm or to about 8 mm or to about 10 mm in each of its dimensions. The size of the openings can range from 0.5 mm to 10 mm. The size of the openings can range from 1 mm to 10 mm. The size of the openings can range from 1 mm to 8 mm. The size of the openings can range from 2 mm to 5 mm. Each opening may have at least one dimension that is greater than at least one dimension of at least one adjacent unfoamed thermoplastic polymeric member. For example, when the thermoplastic polymeric members have a circular circumference, the adjacent openings may have at least one dimension that is greater than the diameter of a cross-section. In another example, a pattern in which the members have thin rectangular shapes, the spaces may have a smallest dimension that is greater than the thickness of the adjacent thermoplastic polymeric members. The openings may be generally elongated in shape, and may be joined in a generally continuous path between openings in different or opposite faces or surfaces of the article. Each face of the article may have a plurality of openings, which may be generally regularly spaced from one another. Opposite faces may have openings arranged in a same pattern.

The sizes of the openings defined by the interconnected, thermoplastic polymeric members are reduced during the foaming process. In one example, the foamed thermoplastic polymeric members may foam to a size where some or all are adjacent to other foamed thermoplastic polymeric members. In another example, spaces remain between the thermoplastic polymeric members after foaming.

For example, the thermoplastic polymeric members may be arranged in a pattern which repeats in two directions perpendicular to one another. The pattern may have at least three repeating units in sequence in at least one direction. The repeating units may be uniform, for example cubes or other geometric shapes that are of a same size, or the repeating units may vary in a regular or irregular pattern. As an example of a varying pattern, a circular pattern may expand from a center in a plane or in three-dimensions.

The article including the structure of interconnected thermoplastic polymeric members is made foamable by heating the thermoplastic polymeric members to a first temperature that is below a temperature at which the structure collapses to soften the thermoplastic polymeric members and infusing the softened thermoplastic polymeric members with at least one inert gas at a first pressure greater than atmospheric pressure that is sufficient to cause the at least one inert gas to permeate into the softened thermoplastic polymeric members. The inert gas may be a noble gas, nitrogen, carbon dioxide, or any combination of these. The first pressure is sufficient to cause the at least one inert gas to permeate into the softened thermoplastic polymeric members. The first exposure is at a pressure and for a duration of time sufficient for an amount of the gas to permeate into the softened polymer to cause at least partial foaming when the pressure is reduced. The amount of gas required may depend upon factors such as the surface area of the structure, the type of polymer, the pressure, and the temperature. The infusing step may be continued until the point of saturation of the thermoplastic polymeric members with the gas.

The article having the thermoplastic polymeric members infused with the inert gas may then be cooled to a second temperature. The second temperature is one at which the gas with not significantly foam the thermoplastic polymeric members in a desired length of time. For example, the second temperature may be at or below about 30° C. Then, the pressure may be reduced to atmospheric pressure. The article then is a foamable article. The article can be removed from the pressure vessel and transferred to another location, for example to a mold in the same building or manufacturing site or transferred to a remote site, before it is foamed. The article is then foamed by heating the thermoplastic polymeric members to a second temperature that is at or below a temperature at which the structure collapses to soften the thermoplastic polymeric members to cause the thermoplastic polymeric members to at least partially foam the thermoplastic polymeric members. The second temperature may be the same as or different from the first temperature at which the thermoplastic polymeric members were infused with the inert gas. Once the second temperature is reached, the pressure is reduced to a second pressure or released (returned to atmospheric temperature) to cause the thermoplastic polymeric members to foam.

The article having the thermoplastic polymeric members infused with the inert gas may instead be foamed immediately without interim cooling or moving or transferring to a different position, piece of equipment, location, or geographic site. Once the softened thermoplastic polymeric members have been infused with the at least one inert gas, the pressure is reduced to a second pressure below the first pressure while the first polymeric resin is below a temperature at which the structure would collapse to at least partially foam the thermoplastic polymeric members. The thermoplastic polymeric members remain softened while foaming. For example, the second pressure may be atmospheric pressure.

When the structure is foaming, expansion of the structure in one or more but less than all directions may be constrained, for example by placing the article with the structure of thermoplastic polymeric members adjacent to or in direct contact with an unyielding surface. The foaming structure may partially conform to the unyielding surface as it presses during foaming against the surface, expanding in unconstrained directions.

The foamable thermoplastic polymeric members may be foamed a second time by repeating the process. The at least partially foamed, thermoplastic polymeric members are heated to a second temperature below a temperature at which the structure collapses to soften the thermoplastic polymeric members and the softened thermoplastic polymeric members are again infused with at least one inert gas at a third pressure that is sufficient to cause the at least one inert gas to permeate into the softened thermoplastic polymeric members, then the pressure is reduced to a fourth pressure below the third pressure while the thermoplastic polymeric members are softened to further foam the thermoplastic polymeric members. The third pressure may be greater than atmospheric pressure. The second temperature may be the same as or different from the first temperature at which the thermoplastic polymeric members were softened and infused during the original foaming process. The inert gas used in the second foaming process may be the same as or different from the inert gas used to originally at least partially foam the thermoplastic polymeric members. Thus, the inert gas may be a noble gas, nitrogen, carbon dioxide, or any combination of these. The amount of inert gas infused into the thermoplastic polymeric members may be up to a saturation point. The third pressure may be the same as or different from the first pressure used in the original infusing step process, so long as it is sufficient to cause the at least one inert gas to permeate into the softened thermoplastic polymeric members. The pressure can be reduced to a fourth pressure while the thermoplastic polymeric members are softened to allow the thermoplastic polymeric members to further foam. The fourth pressure may be atmospheric pressure.

The article may include a structural portion other than the thermoplastic polymeric members infused with the at least one inert gas and subsequently foamed. The structural portion may be polymeric or nonpolymeric. If the structural portion is polymeric, either the structural portion does not soften when exposed to the first temperature and pressure, does not soften when exposed to the second temperature and pressure, or else does not foam when exposed to the second temperature/pressure. The structural portion may be in the form of a solid internal or surface portion of the article or may be a second set of thermoplastic polymeric members. An internal structural portion may be, for example, a single solid portion. An exterior structural portion may be, for example, a solid outer member forming a face of the article.

The article may include a second portion other than the thermoplastic polymeric members infused with the at least one inert gas and subsequently foamed. The second portion may or may not provide any structural support to the thermoplastic polymeric members. The second portion may be polymeric or nonpolymeric. If the second portion is polymeric, the second portion may soften when exposed to the first temperature and pressure, or may soften when exposed to the second temperature and pressure, may foam when exposed to the second temperature/pressure, or any combination thereof. The second portion may be in the form of a solid internal or surface portion of the article or may be a second set of thermoplastic polymeric members. An internal second portion may be, for example, a single solid second portion. An exterior second portion may be, for example, a solid outer member forming a face of the article.

The closed-cell foamed article has a top outer surface, an opposite bottom outer surface, and at least one side outer surface having a common edge with at least one of the top outer surface and the bottom surface, wherein the side outer surface is free of openings.

Among the foamed articles that may be made in this way are footwear uppers, footwear collars, footwear tongues, footwear insoles, footwear midsoles, shinguards, shoulder pads, chest protectors, masks, helmets, headgear, knee protectors, articles of clothing, straps; furniture cushions, and bicycle seats.

In various embodiments, the foamed articles prepared by the disclosed method are further molded or shaped. The foamed articles may be used as inserts in a further molding process, such as in a thermoforming process, or may be attached by adhesives, fasteners, thermally welded, or otherwise to further articles.

The foregoing description of particular embodiments illustrate features of the invention, but the invention is not limited to any of the specific embodiments that have been described. The features described for particular embodiments are interchangeable and can be used together, even if not specifically shown or described. The same may also be varied in many ways. The invention broadly includes such variations and modifications.

We claim:

1. A method of making a foamable article, comprising
   a) forming a structure of interconnected thermoplastic polymeric members spaced to define openings therebetween, the thermoplastic polymeric members comprising a thermoplastic elastomer, wherein the forming step forms the structure as a generally cylindrical shape with an outer surface and an inner surface, and wherein some of the openings extend directly from the outer surface to the inner surface; and
   b) heating the thermoplastic polymeric members to a first temperature below a temperature at which the structure collapses to produce softened thermoplastic polymeric members, and infusing the softened thermoplastic polymeric members with at least one inert gas at a first pressure that is sufficient to cause the at least one inert gas to permeate into the softened thermoplastic polymeric members and produce infused thermoplastic polymeric members.

2. The method according to claim 1, further comprising:
   c) cooling the infused thermoplastic polymeric members to a second temperature; and
   d) reducing the pressure to atmospheric pressure.

3. The method according to claim 1, wherein the thermoplastic polymeric members of step a) are foamed.

4. The method according to claim 1, wherein step a) of forming the structure includes forming the structure in a shape such that the foamable article includes a member selected from the group consisting of: an element for a part of a footwear upper; an element for a footwear collar; an element for a footwear outsole or a part of a footwear outsole; an element for a footwear tongue; an element for a footwear insole; an element for foam padding for a shinguard, a shoulder pad, a chest protector, a mask, a helmet or other headgear; an element for foam padding for a knee protector; an element for placement between textile layers in an article of clothing; an element for a pillow; an element for a cushion; an element for an article of furniture; and an element for a bicycle seat.

5. The method according to claim 1, wherein step a) of forming the structure includes forming the structure in a shape such that the foamable article includes an element for a footwear midsole or a part of a footwear midsole.

6. The method according to claim 1, wherein the infused thermoplastic polymeric members comprise an amount of absorbed inert gas sufficient to produce at least partial foaming in a subsequent step when the infused thermoplastic polymeric members are: (a) again heated to a temperature that softens the infused thermoplastic polymeric members without causing collapse of the structure, and (b) are exposed to a pressure less than the first pressure.

7. The method according to claim 1, wherein the foamable article includes a structural portion other than the thermoplastic polymeric members.

8. The method according to claim 7, where the foamable article comprises a portion that is not softened in step b).

9. The method according to claim 1, wherein step a) of forming the structure in a) is formed by includes three-dimensional printing the thermoplastic polymeric composition elastomer to form the thermoplastic polymeric members.

10. The method according to claim 1, wherein the openings include a plurality of at least substantially regularly-spaced openings.

11. A method of making a foamed footwear component, comprising
    a) forming a structure of interconnected, unfoamed, thermoplastic polymeric members spaced to define openings therebetween, the thermoplastic polymeric members comprising a thermoplastic elastomer, wherein the structure has a first major face and an opposite second major face separated from the first major face by a thickness of the structure, further wherein the structure has openings in and extending at least substantially perpendicular to the first major face;

b) heating the thermoplastic polymeric members to a first temperature below a temperature at which the structure collapses to produce softened thermoplastic polymeric members, and infusing the softened thermoplastic polymeric members with at least one inert gas at a first pressure that is sufficient to cause the at least one inert gas to permeate into the softened thermoplastic polymeric members and produce infused thermoplastic polymeric members; and c) reducing pressure from the first pressure to a second pressure below the first pressure while the infused thermoplastic polymeric members are softened to foam the infused thermoplastic polymeric members and form a foamed footwear component, wherein at least a portion of the second major face abuts a solid surface that prevents or slows expansion or further expansion of the structure in a direction toward the solid surface.

12. The method according to claim 11, wherein step a) of forming the structure forms the interconnected, unfoamed, thermoplastic polymeric members such that when the interconnected, unfoamed, thermoplastic polymeric members are foamed in step c), foamed, interconnected thermoplastic polymeric members are formed and define hexagonal openings.

13. The method according to claim 11, wherein step a) of forming the structure includes three-dimensional printing the thermoplastic elastomer to form the thermoplastic polymeric members.

14. The method according to claim 11, wherein before step b), each opening has at least one dimension that is greater than at least one dimension of at least one adjacent unfoamed thermoplastic polymeric member.

15. The method according to claim 11, wherein step a) of forming the structure includes forming elongated openings in the structure.

16. The method according to claim 11, wherein step a) of forming the structure includes forming the openings defined by the interconnected, unfoamed, thermoplastic polymeric members to each have at least one dimension that is from about 1 mm to about 10 mm.

17. The method according to claim 11, wherein step c) takes place in a mold that prevents or slows the expansion or the further expansion of the structure in the direction toward the solid surface.

18. The method according to claim 11, wherein step a) of forming the structure includes forming the structure in a shape such that the foamed footwear component constitutes a footwear midsole, a part of a footwear midsole, or a footwear midsole pre-form.

19. The method according to claim 11, wherein step a) of forming the structure includes three-dimensional printing the thermoplastic elastomer to form the thermoplastic polymeric members as an integral article including a heel section, a midfoot section, and a forefoot section of a footwear midsole.

20. The method according to claim 11, wherein step a) of forming the structure includes three-dimensional printing the thermoplastic elastomer to form the thermoplastic polymeric members as an article including one or more of a heel section, a midfoot section, and a forefoot section of a footwear midsole.

* * * * *

UNITED STATES PATENT AND TRADEMARK OFFICE
CERTIFICATE OF CORRECTION

PATENT NO. : 10,793,693 B2
APPLICATION NO. : 16/206184
DATED : October 6, 2020
INVENTOR(S) : Farris et al.

Page 1 of 1

It is certified that error appears in the above-identified patent and that said Letters Patent is hereby corrected as shown below:

In the Claims

Column 14, Claim 1, Line 2:
After "comprising", insert --:--

Column 14, Claim 8, Line 54:
Delete "where" and insert therefor --wherein--

Column 14, Claim 9, Line 57:
After "structure", delete "in a) is formed by"

Column 14, Claim 9, Line 58-59:
After "printing the thermoplastic", delete "polymeric composition"

Column 14, Claim 11, Line 65:
After "comprising", insert --:--

Signed and Sealed this
Twenty-second Day of December, 2020

Andrei Iancu
*Director of the United States Patent and Trademark Office*